Oct. 22, 1968 E. C. BAROCELA 3,407,272

PHOTOGRAPHIC SOUND SYSTEM FOR ELIMINATING FILM BLEMISH NOISE

Original Filed June 15, 1964

INVENTOR.
EDWARD C. BAROCELA

BY

Bierman & Bierman

ATTORNEYS

United States Patent Office
3,407,272
Patented Oct. 22, 1968

3,407,272

PHOTOGRAPHIC SOUND SYSTEM FOR ELIMINATING FILM BLEMISH NOISE

Edward C. Barocela, Binghampton, N.Y., assignor to Instruments Corporation of America, a corporation of New York Continuation of application Ser. No. 375,248, June 15, 1964. This application Sept. 7, 1966, Ser. No. 593,232
6 Claims. (Cl. 179—100.3)

ABSTRACT OF THE DISCLOSURE

A photographic sound system employing a sound film composed of two superimposed layers of different color tints, two color filters of different spectral range, and two photoelectric transducers to cancel film blemish noise. A 180 degree out-of-phase connection between transducers results in noise cancellation, since blemish noise modulations are present at both transducers while sound modulations are restricted to only one transducer due to the spectral ranges of the color layers and filters.

This application is a continuation of copending application, Ser. No. 375,248, filed June 15, 1964, now abandoned.

This invention relates to a means for recording and reproducing sound on film using either the variable area system or the variable density system. The invention has specific relationship to the use of color tracks for eliminating noise due to scratches and dirt.

Nearly all photographic recording on film at the present time is done by means of black and white exposure on a clear track. This type of recording produces excellent results when there are no scratches or other imperfections on the film. However, when scratches and dirt are accumulated during the normal process of showing the film in a projector, considerable noise may result, especially when narrow tracks are used. The present invention eliminates the noise due to scratches by providing a color system of recording which employs two photosensitive transducers in the projector instead of one and balances the noise generated between the two transducers so that it may be eliminated by appropriate circuit means.

Several systems proposed in the past have made use of "push-pull" recordings in which a double track is modulated oppositely, only half of the track carrying sound waves of positive polarity and the other half those of negative polarity.

The present invention does not employ a push-pull track but a standard track of either the variable density or variable area type, recorded and/or printed in color for purposes of noise reduction.

One of the objects of this invention is to provide an improved means for recording and reproducing sound on film which avoids one or more of the disadvantages and limitations of prior art systems.

Another object of the invention is to reduce the noise which is produced by scratches and dirt on the film.

Yet another object is to print a color sound track from a conventional negative that can be reproduced without noise.

Still another object of the invention is to apply a color recording track to a motion picture film arranged to show pictures in black and white. This color track also reduces the noise due to scratches and dirt.

The invention comprises a sound track on motion picture film which includes a layer of color that contains the modulations which are varied in response to the amplitude and frequency of the sound to be recorded, by either of the well-known systems, variable area or variable density.

A second layer occupies the same sound track area and is either tinted with a uniform unmodulated color or left clear.

For proper operation of the system, the color of the modulated layer must be such that it transmits light within a restricted spectral range, preferably that of one of subtractive colors "yellow," "cyan," and "magenta" commonly used in color photography. The second layer should transmit light waves outside the above spectral range, but also wave lengths included in said range.

For instance, if the modulated layer is tinted yellow, the second layer may be tinted magenta. Thus, the second layer transmits blue, a wave length outside the range transmitted by the yellow layer, but it also transmits red light, in common with the yellow layer.

A feature of the invention includes the manner in which the sound is reproduced from a sound track recorded as described above. The reproducing device includes a beam of light applied to the sound track and two photosensitive transducers on the other side of the track for receiving the light modulations. One of the transducers may be shielded by a filter which is tinted to pass light waves in the same manner as the modulated layer on the track. The second transducer is then shielded by a filter colored so as to pass light of a wave length range not passed by said layer. Preferably, these transducers can have their sensitivity limited to the desired range of wave lengths, in which case the color filters are not needed.

Another feature of the invention includes a method of dying a black and white film after the film has been exposed in the usual manner to produce a black and white sound track.

For a better understanding of the present invention, together with other and further objects thereof, reference is made to the following description taken in connection with the accompanying drawings.

Figure 1:
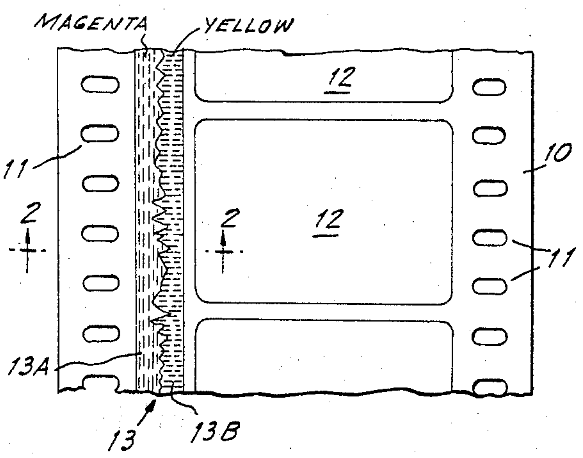
FIG. 1 is a plan view of a section of motion picture film showing the picture area and the sound track.
Figure 2:
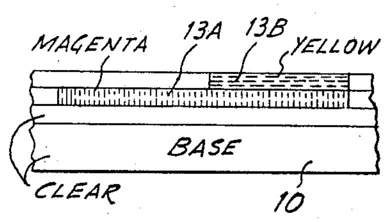
FIG. 2 is a cross sectional view of a portion of the film shown in FIG. 1, taken generally along line 2—2 of FIG. 1 and shown to an enlarged scale.

Referring now to the figures, a sample film is shown in FIGS. 1 and 2 where the film strip 10 contains the usual sprocket holes 11 and picture areas 12. The sound track, as usual, is an elongated area 13, shown here with a variable area sound record. As shown in FIG. 1, area 13A is colored magenta and area 13B is colored yellow. As shown in greater detail in FIG. 2, the magenta area includes the entire sound track area while the yellow area 13B is contained in a second layer of the film, generally the top layer, and contains the sound modulations which represent the amplitude and frequency variations of the recorded sound. If this film is a three layer color film, the third layer 14 is maintained in its transparent condition. If this track 13 is viewed by transmitted light, area 13B appears red since this is the only color transmitted by both the yellow and the magenta layers. The yellow-magenta combination is only one of many combinations which can be used in such an arrangement in order to balance out the scratches and dirt which may cause noise.

As explained in a later paragraph, the unmodulated track can simple be a transparent area without any color dyes or tints.

Figure 3:
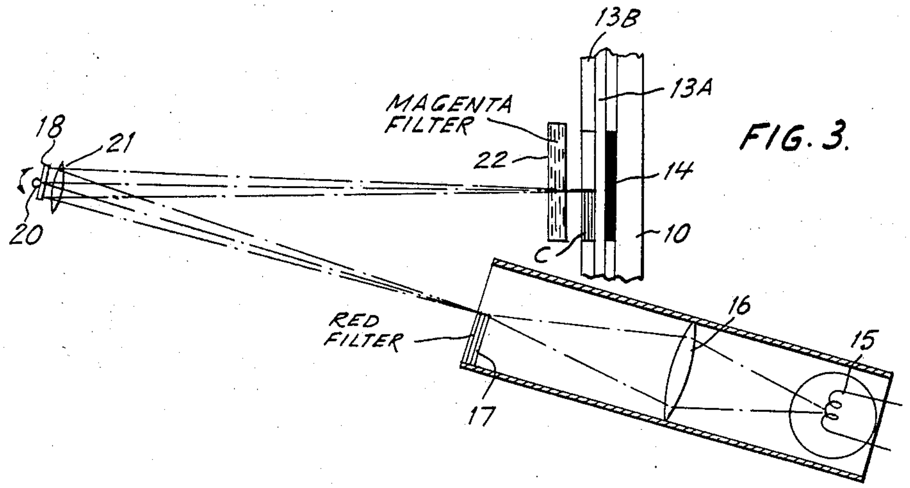
FIG. 3 is a schematic view indicating the method of recording a sound track on color film.

There are many ways of supplying tinted layers to a sound track. This is especially true if the sound has been recorded on a separate negative film and then printed onto a positive print. The recording system shown in FIG. 3 is for recording a sound track on a color film which will later be processed by the reversal method and dyed to produce a positive for showing a picture and reproducing sound. In this case the top layer of the color emulsion is sensitive to blue, the intermediate layer is sensitive to green, and the lower layer is sensitive to red. The usual lamp 15 which produces white light is focussed by a lense 16 onto a mask 17 which in this case is a red filter instead of the usual opaque barrier. An oscillating mirror 18, pivoted on a shaft 20, is oscillated behind a second lens 21 in accordance with the sound waves to be recorded. Light reflected by mirror 18 is directed to the top layer 13B through a filter which is tinted to transmit the red and blue but which is opaque to green light. This filter 22 is called magenta.

The result of the above described exposure produces a third layer 14 which is fully exposed because red light is passed by both the red filter 17 and the open space adjoining it and by the magenta filter. The second layer 13A which is sensitive to green will not be exposed at this time. The top layer 13B will have its modulation area C exposed and an unmodulated portion which will be clear when first developed. After reversal processing and dying in the usual manner, the top layer modulation area will be tinted yellow as shown in FIG. 2, the second layer will be tinted magenta, and the third layer will be clear. When white light is applied to such a processed film the portions under the yellow film will transmit only red, since this light must pass through the second layer of magenta. The portions of light in the unmodulated areas will contain both red and blue, since they pass through the second layer which is tinted with a magenta dye.

The recording system of FIG. 3 has been described in order to facilitate an understanding of the principle of operation of the invention, but in practice the main advantage of the present system is that no special bicolor recordings are required. Rather, a conventional sound negative can be used to produce the color sound track, printing it on color positive stock in a regular printer, using the proper filters to expose the corresponding emulsion layers.

Figure 4:
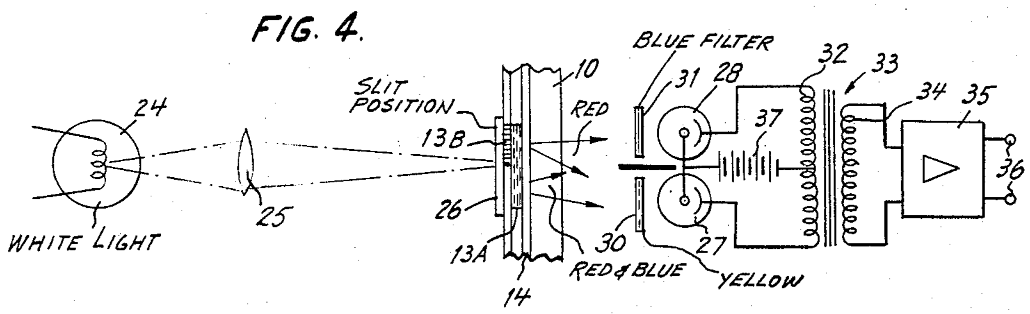
FIG. 4 is a schematic diagram showing how sound recorded in accordance with the invention is reproduced. This view also shows a diagram of connections for two photosensitive transducers.

When such a film is used in a projector, the reproducing system is shown in FIG. 4. Here a white reproducing light 24 is focussed onto a slit 26 by a lens 25. In accordance with the usual practice, the slit is disposed at 90 degrees from the direction of travel of the film. On the other side of the film are two photosensitive transducers 27 and 28. Transducer 27 receives light from the entire field and this light passes through a yellow filter 30. Since all areas of the track transmit red, transducer 27 is not sensitive to the modulation variations but is sensitive to all the variations due to the scratches and dirt which may be on the film.

Transducer 28 is mounted behind a blue filter 31 which transmits only blue light. However, this transducer also receives light from the entire sound track area. It is also subjected to light modulations due to the scratches and dirt on the film. But transducer 28 is masked by the upper layer 13B because this layer has been tinted yellow and will not pass blue light, therefore this transducer will also be modulated by the sound record carried in the upper layer.

It must be understood that in order that a transducer be modulated by the sound record carried in an emulsion layer, the color of this layer must be complementary to the color to which the transducer is sensitive. In other words, the tinted layer must absorb the light waves capable of exciting the transducer. Thus the sound record will control, according to its color density, the degree of excitation of the transducer.

As an example (in a Variable Area sound record), when yellow layer 13B covers the full width of the sound track during a modulation peak, no blue light reaches transducer 28. When the yellow layer covers only half of the track width during an instant of 50% modulation, the transducer is excited by the blue light passing through the portion of the track not blocked by the yellow dye. Consequently, the transducer is excited in direct proportion to the amount of blue light passed by modulated layer, which in turn is inversely proportional to the density of the yellow dye.

Conversely, transducer 27 is insensitive to blue light and is not affected by the sound record since the modulated density of the yellow dye does not significantly alter the amount of red light that reaches transducer 27 through filter 30 and the unmodulated layer 13A.

Transducers 27 and 28 are connected through the primary winding 32 of a transformer 33 having a secondary winding 34. The secondary winding is connected through the usual amplifier 35 to output terminals 36. The voltage supply source 37 is connected to the anodes of both transducers while the cathodes of these transducers are connected respectively to the end terminals of winding 32. It is obvious from this diagram that the two transducers are connected in opposition and any variations of current produced by one transducer will act to obscure and cancel similar variations produced by the other transducer. Since the transducer 27 behind the yellow filter 30 receives light from the entire area, it is not subjected to the variations of modulation produced by layer 13B. Transducer 28, however, is affected by these variations and the sound recorded on the film is transmitted by this transducer.

It should be apparent by now that the basic requirement for successful noise reduction is that one of the photoelectric transducers is affected only by the variations in light intensity caused by scratches and other blemishes on the film, while the other transducer is affected by those same variations but also by the sound modulations of the first track.

In general, one of the transducers is sensitive to light of the color absorbed by the modulated track, while the other transducer is sensitive to light of a spectral range that includes the color or colors transmitted by the modulated track. In practice, the sound-producing transducer 28 can be a photocell with an "S–4" spectral response, and the noise-cancelling transducer 27 can be a photocell with an "S–1" spectral response or one of the newer solid-state photosensitive devices having sensitivities well into the infrared spectrum. These devices have high level outputs and can therefore be connected to the amplifier at a later stage in the circuit, whereby their signal is automatically out of phase with respect to the sound signals from the S–4 photocell.

A solid-state photodiode or phototransistor is sensitive to visible light but mainly to infrared radiation. The dyes commonly used in color films are transparent to infrared; therefore a tint applied to the unmodulated layer, such as 13–A; FIG. 2, would not significantly affect a transducer of this type. In this case said layer can be left clear, with no color dyes.

The S–4 photocell has maximum sensitivity in the blue-green region of the spectrum. The modulated sound track should then be of a color that absorbs those wave lengths. The yellow and magenta layers of a monopack color film fulfill this requirement. In this case it is advantageous to confine the recording of the sound modulations to the top emulsion layer.

The use of the top layer for the sound record has several advantages: it minimizes the light scattering effect of the silver emulsion during recording and/or printing of the track; it imposes fewer restrictions to the design of the optical systems used in recorders, printers and reproducers; and it facilitates the production of copies by contact printing due to the fact that the modulated layers of both the original and the print stock are held in closer contact in the printer.

These factors are significant in the case of the layer that carries the sound modulations. On the other hand, the noise-compensating layer is clear or evenly tinted and carries no modulation, therefore its printing is not critical.

These tracks can also be reproduced in a conventional system employing only one photosensitive transducer, provided that this transducer is sensitive to light wave lengths in the region transmitted by the unmodulated layer or layers but not sensitive to wave lengths transmitted by the modulated layer.

From the above description and operation, it is evident that a system of noise reduction has been developed for sound-on-film devices. This system is especially useful when applied to 8 mm. and other narrow-gauge films.

The foregoing disclosure and drawings are merely illustrative of the principles of this invention and are not to be interpreted in a limiting sense. The only limitations are to be determined from the scope of the appended claims.

What is claimed is:

1. A photographic sound system comprising a sound record on photographic film and means for reproducing the sound thereof, said record consisting of a sound track composed of two superimposed layers, the first layer being tinted so as to transmit light waves within a restricted spectral range and being modulated in its color density so as to vary, according to the sound waves being reproduced, its absorption of the light wave lengths outside said restricted spectral range, and a second unmodulated layer transparent to light waves within a spectral range wider than that transmitted by the first layer but including the wave lengths transmitted by said first layer, said first and second layers being superimposed within the area of said sound track, said means for reproducing sound including two photoelectric transducers illuminated by light through said sound track and two filters, the first filter transmitting light waves outside the spectral range transmitted by the first layer but within the wider range transmitted by the second layer to the first transducer, the second filter transmitting light waves transmitted by both layers to the second transducer, said first and second transducers being connected 180° out of phase, whereby the noise modulations resulting from blemishes on the film affect both transducers and are cancelled, while the sound modulations carried in said first layer affect the first transducer only and are normally amplified.

2. A sound system according to claim 1 wherein said means for reproducing sound includes a light source, optical means for focusing said source into a narrow slit on said sound record.

3. A sound system according to claim 1 wherein said transducers are connected to an amplifying circuit at points that are 180° out of phase, whereby said circuit cancels noise resulting from blemishes in the film while permitting the sound track to be normally amplified.

4. The sound system of claim 1 in which said unmodulated second layer is transparent to the visible and infrared spectrums.

5. The sound system of claim 1 in which said photographic film is a multilayer color film.

6. The sound system of claim 5 in which the modulated first layer is contained in the upper emulsion layer of said multilayer film.

References Cited

UNITED STATES PATENTS 2,527,463 10/1950 Sziklai ------------ 179—100.3

3,281,151 10/1966 Kaprelian et al. -- 179—100.3 X

BERNARD KONICK, *Primary Examiner.*

R. F. CARDILLO, *Assistant Examiner.*